July 21, 1970          J. W. BLACK          3,521,232
SPEED INDICATOR FOR VEHICLES
Filed Oct. 16, 1967
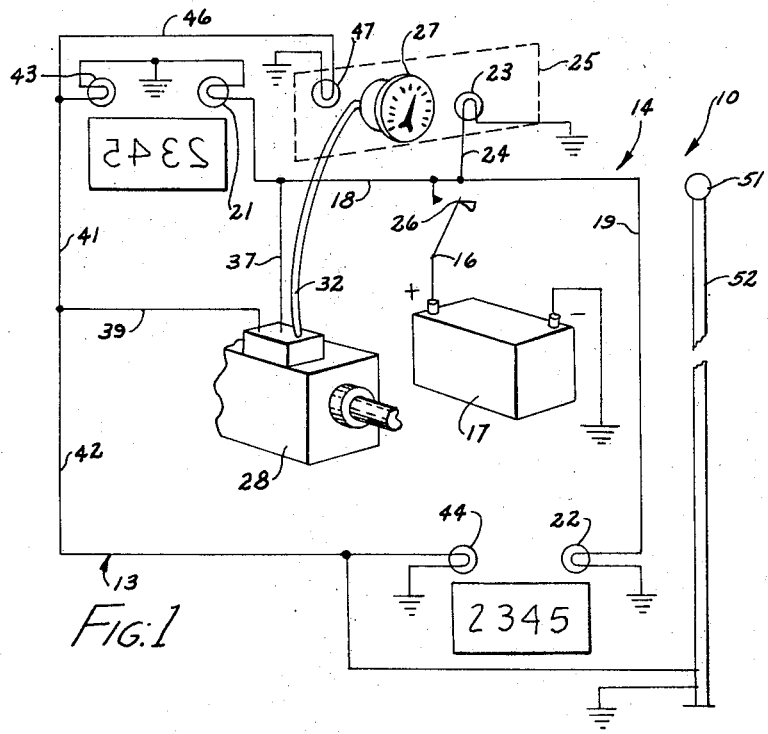
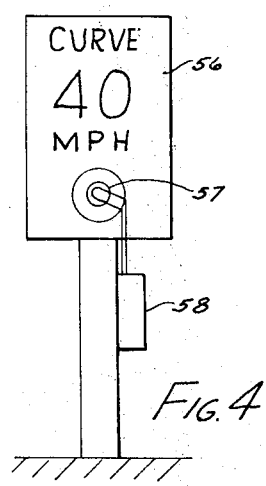
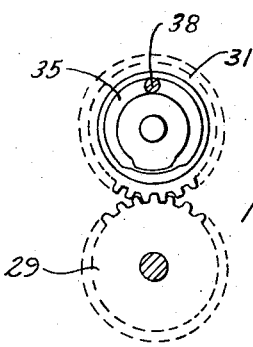
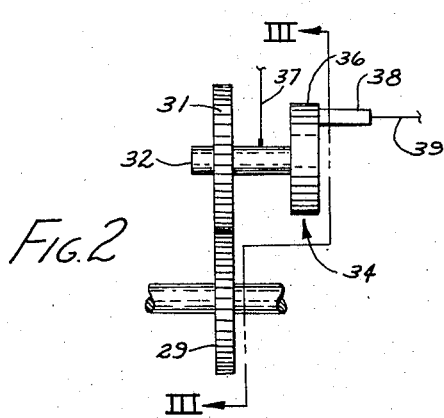
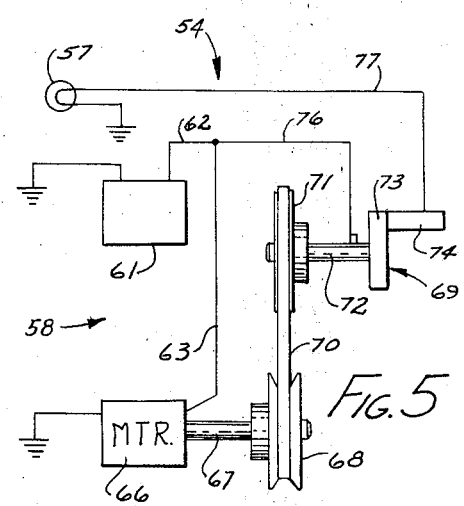
INVENTOR.
JOHN W. BLACK
BY
Woodhams, Blanchard & Flynn
ATTORNEYS United States Patent Office 3,521,232
Patented July 21, 1970

3,521,232
SPEED INDICATOR FOR VEHICLES
John W. Black, Prairieville Township, Barry County, Mich., assignor to Pemco Wheel Company, Kalamazoo, Mich., a corporation of Michigan
Filed Oct. 16, 1967, Ser. No. 675,506
Int. Cl. B60q 1/00
U.S. Cl. 340—62     7 Claims

ABSTRACT OF THE DISCLOSURE

A speed-indicating system in a vehicle comprising electric lamps and a device for varying the frequency of changes in the intensity of such lamps in response to the speed of the vehicle. The lamps may be mounted both inside and outside of the vehicle. Similar systems may be mounted along the road at convenient intervals and at dangerous points in the road. The road-mounted systems are pulsated at constant rates so that the vehicle operator can control his speed by synchronizing the pulsations of the lamps in his car with the pulsations of the road systems.

BACKGROUND OF THE INVENTION

This invention relates in general to speed-indicating and speed-control systems for vehicles and, more particularly, to a type thereof including pulsating electrical lamps which permit the driver to ascertain the relative speed of his vehicle, particularly at night, without making constant reference to his speedometer.

Driving land vehicles at night or during semidarkness, even under favorable road conditions, has always been dangerous, particularly at typical road speeds. However, during the last 10 years, traffic on the principal highways has become so heavy that drivers must be constantly alert. Frequently, decisions which may involve the difference between life and death must be made by vehicle drivers within a fraction of a second. Thus, it has become increasingly important that drivers be given as much warning as possible of impending danger and as much freedom as possible to watch the movements of other vehicles, particularly during darkness or semidarkness. Among the most serious problems confronting the night driver is that of judging the speed of vehicles which he is approaching or which are approaching him. This problem is particularly acute at night when the driver cannot see reference objects plainly for judging his rate of closure. This problem has always been troublesome for persons with poor vision since poor vision is usually accompanied by an impaired ability to perceive quickly changes in depth of focus.

Numerous attempts have been made to avoid part of the foregoing problems by use of various types of flashing road signs including those in which the speed of the vehicle is automatically sensed and indicated in numerical values. However, when weather, road conditions and/or traffic conditions are bad, the driver may be altogether too busy or otherwise unable to see such speed-indicating signs. Moreover, the reading of such signs requires the driver to take his eyes away from the road for a specific period of time during which a dangerous condition can develop. Furthermore, for every road sign that gives him information with respect to the safe speed at that point in the road, there are usually a dozen others which provide other information having no bearing upon the proper speed, much less the speed of his vehicle and he must check them all to avoid missing the correct one.

The problems involved in controlling the speed of highway traffic have increased to the point where enforcement is little more than a threat. That is, by the time a patrol car has gotten into position for checking the speed of a speeding vehicle, the vehicle operator has either become aware of the patrol car and has returned to a proper speed, or the patrol car has spent the better part of a half hour with one car. Often, the driver has no intention of exceeding the speed limits. However, due to complacency, fatigue or distractions by conversation or the radio, drivers frequently exceed speed limits by 10 or 15 miles per hour without realizing it.

Radar and other speed-indicating equipment have been used in attempts to control the speed of traffic, but this usually involves two vehicles and/or it is severely restricted to operation in a single location. Moreover, and of far more importance, such speed-indicating equipment fails to help the concientious driver maintain control over his own vehicle, it attacks the symptoms and not the cause of the problem and equally importantly it does not provide the much needed assistance to the vehicle driver in determining rates of closures with other vehicles. Furthermore, the intentional speeder can usually spot radar installations and similar "speed traps" and merely slow down to avoid apprehension. If he is successful, such success may even tempt him to be more reckless with his speed.

It is well known that humans can readily detect variations in light intensity with their peripheral vision so that the synchronizing of pulsating lights can be easily accomplished by a vehicle operator without moving his eyes away from the road and without distracting his attention.

Accordingly, a primary object of the invention is the provision of a speed-indicating or signaling system adapted for use with a land vehicle either by itself or in combination with a secondary signaling system mounted along the road whereby the vehicle operator can synchronize his vehicle speed with a predetermined speed value or can judge the speeds of other vehicles without taking his eyes away from the road.

A further object of this invention is the provision of an indicating system, as aforesaid, including pulsating lamps which can be visually synchronized and wherein the frequency of pulsations is relative to the speed of the vehicle.

A further object of this invention is the provision of an indicating system, as aforesaid, which can be readily observed by the vehicle operator without impairing in any way his ability to operate the vehicle in a safe manner, and which permits the easy detection of vehicles that are not moving at normal traffic speeds.

A further object of this invention has been the provision of an indicator system, as aforesaid, which can be readily installed on existing vehicles without altering the operation or performance thereof.

Other objects and purposes of this invention will become apparent to persons familiar with speed-indicating devices upon reading the following descriptive material and examining the accompanying drawings, in which:

FIG. 1 is a schematic view of a speed-indicating system including those parts of a typical automotive vehicle to which the system is connected and through which it operates.

FIG. 2 is a fragment of the gear mechanism and current interrupter connected to the speedometer cable for the indicating system of the invention.

FIG. 3 is a sectional view taken along the line III—III in FIG. 2.

FIG. 4 is a front, elevational view of a speed indicator adapted for installation along a road.

FIG. 5 is a schematic diagram illustrating a circuit for the speed indicator shown in FIG. 4.

SUMMARY OF THE INVENTION

The objects and purposes of the invention, including those set forth above, have been met by providing a speed-indicating system for a vehicle including electrical lamps and a current interrupter adapted to pulsate the intensity of the lamps in response to the speed of movement of the vehicle in which the indicating system is installed. Secondary installations of the same signaling system are mounted along the road and pulsated at fixed frequencies for comparison with the frequency of the vehicle system to indicate safe speeds.

DESCRIPTION OF THE PREFERRED EMBODIMENT

The speed-indicating system, a preferred embodiment of which is shown schematically at 10 in FIG. 1, may be mounted within a vehicle, such as an automobile, and has an electrical circuit 13 which is herein shown in conjunction with the conventional electrical circuit 14. Circuit 14 has a lead 16 extending from a power source, such as the vehicle battery 17 through switch 26 to conductors 18 and 19, which in turn are connected to front and rear license plate lamps 21 and 22, respectively. Conductor 19 is also connected to lamp 23 in instrument panel by conductor 24. The lamps 21, 22 and 23 are suitably grounded and the conventional switch 26 controls the ignition of these lamps.

The electrical circuit 13 and a speedometer 27 operate cooperatively with a conventional automotive transmission 28. A transmission driven gear 29 (FIGS. 2 and 3) drives a gear 31 located on the end of a flexible cable 32 which operates speedometer 27 in a conventional manner.

The electrical circuit 13 has a current interrupter 34 including a commutator 36 which is mounted for rotation with gear 31. In the preferred embodiment, commutator 36 (FIG. 2) is disk shaped and has a commutator bar 35 mounted on the side thereof. A conductor 37 connects the commutator bar 35 with conductor 18 of circuit 14, thereby supplying circuit 13 with electrical current when switch 26 is closed. Current interrupter 34 also includes a brush 38 which is in sliding contact with the commutator bar 35 which may be conventional in structure. In this case, the bar 35 has areas of varying resistance whereby brush 38 receives a continuous current of varying intensity. However, if desired, the commutator could, by having nonconductive breaks in the commutator bar, provide intermittent discontinuations in the electrical current flow.

An output conductor 39 connects brush 38 of current interrupter 34 with conductors 41 and 42, which are connected to front and rear license plate lamps 43 and 44, respectively. A conductor 46 extends from conductor 41 to the instrument panel signal lamp 47. The lamps 43, 44 and 47 are each suitably grounded and the current interrupter 34 causes their intensity to pulsate at a frequency which is relative to the rate of speed of the vehicle when it is moving. Other types of lamps may be provided as desired. For example, slow-moving vehicles, such as farm tractors, may be provided with an elevated lamp 51 mounted on a mast 52. Such a lamp provides additional warning that the vehicle is traveling at a slow rate of speed, and it can be readily seen from any side of such vehicle.

A roadside system 54 indicating the appropriate safe speed in that vicinity may be mounted on a conventional speed limit sign 56 and has a lamp 57 connected to a pulsating electrical power source 58.

Any type of pulsating power source may be used so long as the pulsations can be preset at a given, constant frequency. Pulsating power source 58 in the preferred embodiment includes a source of electrical energy 61, which is connected by lead 62 and conductor 63 to an electric motor 66 having a shaft 67 driving a variable pitch pulley 68. Pulley 68 is connected by belt 70 to pulley 71 which is mounted on the shaft 72 of current interrupter 69. Current interrupter 69, which may be similar to current interrupter 34, includes brush 74 and a commutator 73 mounted for rotation with shaft 72. An electrical conductor 76 extends from lead 62 to commutator 73 and a conductor 77 connects lamp 57 with brush 74.

The motor 66 turns shaft 67 at a predetermined, constant speed. The rotational speed of the commutator 73 is varied by adjusting pulley 68, thereby adjusting the pulsating frequency of lamp 57. In particularly dangerous areas, it may be desirable to have the change in intensity of lamp 57 be relatively large so that it cannot be overlooked. However, in system 10, the variation in intensity, especially within the vehicle, may be relatively small so that it is merely a slight dimming and, therefore, does not disturb the operator.

The pulsating frequency of source 58 may be preset at a constant value indicating maximum safe rate of speed or the particular speed limit in that area. For example, the speed limit on a straight portion of roadway may be 70 miles per hour, in which case the intensity of lamp 57 would pulsate at a frequency so indicating. On a curve in the road, the safe speed limit may be 40 miles per hour. In such locations, the intensity of the lamp 57 will pulsate at a slower frequency corresponding to this rate of speed.

A portable unit whose circuitry is like that of system 54 may be provided for the use of law enforcement personnel in checking the speed of traffic at any selected point along a road.

OPERATION

Although the operation of the speed-indicating system 10 and the roadside system 54 embodying the invention will be apparent to a skilled person from the foregoing description, said operation will be summarized hereinbelow.

As the automotive transmission 28 is operated, gear 32 drives current interrupter 34 at a speed which corresponds to that of the moving vehicle. The current interrupter 34 supplies a pulsating electrical current to lamps 43, 44, 47 and/or 51, thereby causing the intensity of said lamps to pulsate at a frequency corresponding to the speed of the vehicle. If the vehicle is traveling at a slow speed, the intensity of lamps 43, 44, 47 and/or 51 will pulsate slowly, whereas, if the vehicle is traveling rapidly, the intensity will pulsate rapidly. By using peripheral vision alone the vehicle driver can, for example, easily determine if his instrument panel lamp 47 is pulsating more rapidly than the roadside lamp 57 and, without taking his eyes from the road, can slow his vehicle to a proper speed. As a vehicle driver approaches a curve, he can synchronize his lamp 47 with the lamp 57, which indicates the safe speed limit for the curve.

There are innumerable other instances where the speed-indicating system 10 would be of substantial value. For example, one can compare the frequency of one's own instrument panel lamp 47 with the rear license plate lamp 44 on a vehicle being approached, thereby aiding in estimating the difference in traveling speed and the corresponding rate of closure. Likewise, when commencing to pass one vehicle, the driver can observe the front license plate lamp 43 of oncoming traffic and thereby determine if he has sufficient time in which to pass safely.

The speed-indicating system can also be of great value to a law enforcement agent. That is, a portable pulsating unit can be manually adjusted in determining the speed of other vehicles. Such a unit could be particularly advantageous since it would enable the officer to determine the traveling speeds of other vehicles at a much greater distance than any previous method and even in spite of the fact that he is traveling in a different direction, such as approaching the other vehicle from the front or side.

Although a particular preferred embodiment of the invention has been disclosed above for illustrative purposes, it will be understood that variations or modifications thereof which lie within the scope of the appended claims, are fully contemplated.

The embodiments of the invention in which an exclusive property or privilege is claimed are defined as follows:

1. A speed-indicating system for a land vehicle having ground-engaging wheels, rotatable means connected to said wheel means and rotatable therewith at a rotational speed corresponding to the rotational speed of said wheels, and a source of electrical energy, comprising:
   an electrical circuit including lamp means connected in series with said source of electrical current and a current varying device responsive to said rotational movement of said rotatable means and electrically connected in series with said lamp means whereby the flow of electrical current to said lamp means and the intensity of the illumination of said lamp means will be periodically varied and the frequency of said variations will be proportional to the speed of the vehicle; and
   a second electrical circuit independent of said first circuit and having a source of electrical current connected in series with a second lamp means and a second current varying device whereby the flow of current to said second lamp means and the intensity of the illumination of said second lamp means are varied at a predetermined frequency, said first and second lamp means being located so that a visual comparison can be made between the frequencies of their variations.

2. A system for indicating the speed of a moving land vehicle having a source of electrical energy, ground-engaging wheels and shaft means coupled with said wheels and capable of rotation at a speed corresponding to the rotational speed of said wheels, comprising:
   a first electrical series circuit connected to said source of electrical energy and including first lamp means and a device for varying the flow of energy to said first lamp means and thereby varying the intensity of the illumination of said first lamp means, said device being coupled with said shaft means so that the frequency of the variation in energy flow and said intensity correspond to the rotational speed of said wheel means;
   a second electrical series circuit independent of said first electrical circuit and comprising a second source of electrical energy, a second lamp means and a second device for varying the flow of energy in said second circuit, the frequency of variations by said second device being constant and adjustable;
   whereby the vehicle operator can make a visual comparison between the frequencies of variations in the intensities of illumination of said first and second lamp means.

3. An indicator system according to claim 2, wherein said first energy varying device includes gear means, and said shaft means is the speedometer cable of said vehicle to which said gear means is connected;
   wherein said first lamp means includes a first lamp mounted adjacent the operator's position of the vehicle in clear view of the operator and said second lamp means is mounted at a fixed position along the path of movement of the vehicle.

4. An indicator system according to claim 2 wherein said second electrical series circuit is substantially identical with said first series circuit and is mounted upon a second vehicle.

5. An indicator system according to claim 2, wherein said first lamp means comprises one lamp mounted near the operator's position within the vehicle and easily within his visual range and at least one other lamp mounted externally of said vehicle where it can be readily viewed.

6. An indicator system according to claim 2, wherein the variation in illumination of said lamp means in said first and second circuits is only sufficient to be readily detected by normal peripheral vision; and
   wherein the frequency of the variations in illumination for a speed range of between 30 miles per hour and 70 miles per hour varies from about 180 variations per minute to about 420 variations per minute.

7. An indicator system according to claim 2, wherein said second electrical circuit is in a portable unit and includes control means capable of adjusting the frequency of variations to indicate corresponding rates of vehicular speed.

References Cited

UNITED STATES PATENTS

| | | | |
|---|---|---|---|
| 2,457,968 | 1/1949 | Allen et al. | 340—332 |
| 2,683,868 | 7/1954 | McKnight | 340—43 |

ALVIN H. WARING, Primary Examiner

U.S. Cl. X.R.

340—263; 180—82